3,034,289
SOLID PROPELLANT CATAPULT WITH LIQUID
PROPELLANT ROCKET ASSIST
Albert M. Stott, Aldan-Clifton Heights, Pa., and Norman J. Waecker, Masonville, N.J., assignors to the United States of America as represented by the Secretary of the Army
Filed Dec. 4, 1958, Ser. No. 778,267
4 Claims. (Cl. 60—26.1)
(Granted under Title 35, U.S. Code (1952), sec. 266)

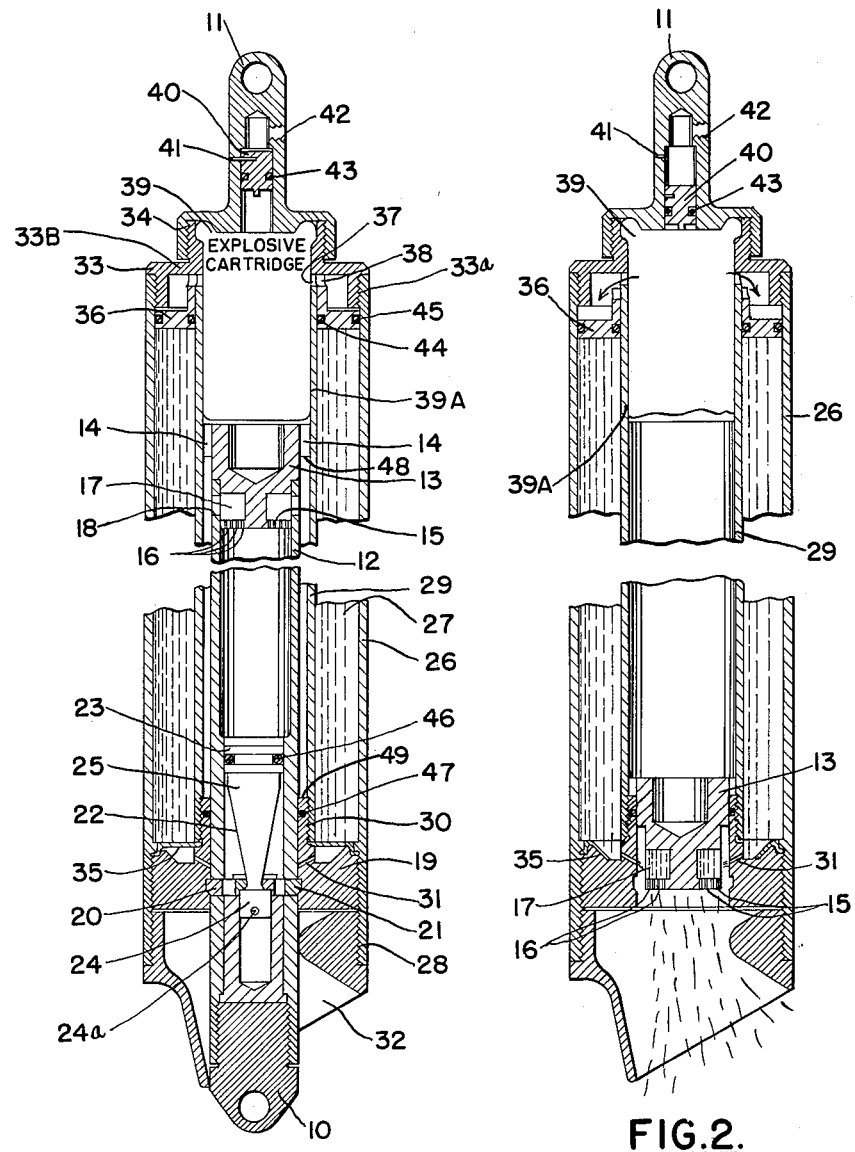

The invention described herein may be manufactured and used by or for the Government for governmental purposes without the payment to us of any royalty thereon.

This invention relates to catapults such as are utilized to eject a mass from a moving aircraft, and more particularly to a catapult of the type wherein the application of one force to the mass is followed by the application of another force which continues to be exerted for some time after the mass has left the aircraft.

As stated in a copending application of Hugh D. MacDonald, Jr., Albert M. Stott and Normal J. Waecker, Serial No. 727,750, filed April 10, 1958 for "Extensible Rocket Catapult," it is desirable that the application of the ejecting force be continued for a time interval after the mass leaves the aircraft. This has the advantage that it imparts a higher trajectory to the mass, minimizes its deceleration and stabilizes it so that it does not tumble.

In achieving these results, the invention of the aforesaid copending application utilizes a solid propellant rocket. This operates satisfactorily under most conditions but leaves something to be desired where the thruster is required to operate at very low temperatures. This is so far the reason that the solid propellant is brittle at low temperatures and subject to failure through cracking and disintegration before and during burning.

The present invention avoids this difficulty by the provision of an improved catapult which is similar to that of the aforesaid copending application in that the initial ejecting force is produced by a solid propellant but differs therefrom in that the rocket propellant is a liquid which is ignited by a catalytic and/or pyrotechnic flame holder previously heated by the gas generated by the solid propellant.

The invention will be better understood from the following description when considered in connection with the accompanying drawings and its scope is indicated by the appended claims.

Referring to the drawings:
FIG. 1 is a sectional view of the catapult in its standby condition, and
FIG. 2 illustrates the removable part of the catapult, immediately following its separation from the part remaining with the aircraft.

The figures of the drawing show a member 10 which is attached to the aircraft and a member 11 which is attached to the mass to be ejected.

An inner tube 12 is threaded onto the member 10 at one end and has extending into its other end a detachable plug 13. This plug has longitudinal grooves 14 around its outer periphery and forms an annular recess 15 which opens into the inner tube 12 through a plurality of passageways 16. The lands between the grooves 14 form a shoulder 48 adapted to engage a shoulder 49 for a purpose hereinafter explained. The recess 15 contains a flame holder 17 and, in its illustrated position, registers with openings 18 in the tube 12. The flame holder may consist of particles or mesh of platinum, zirconium or the like.

The inner tube 12 is coupled to a member 19 by a lock including two U-shaped members 20 and 21 and a member 22 which has its opposite ends in the form of pistons 23 and 24 and its intermediate section in the form of a tapered wedge 25. In the illustrated positions of the various parts, the U-shaped members 20 and 21 are fixed in position by their engagement wtih the piston 24 and a shear pin 24a. When the member 22 is moved toward the member 10, however, shear pin 24a shears and the wedge 25 moves the U-shaped members 20 and 21 toward one another so that the inner tube 12 is unlocked from the member 19.

The member 19 (1) is attached to the outer casing 26 of a liquid chamber 27 by means of a thread 28, (2) is attached to the inner casing 29 of this chamber through a thread 30, and (3) has extending through it a plurality of orifices 31.

The outer casing 26 has a nozzle 32 threaded into one of its ends and at its other end is threaded onto an outwardly extending flange 33 of a cap 33b to which the member 11 is attached. The member 11 is thus connected to the inner tube 29 through threads 34 and 33a, outer tube 26, thread 28, member 19 and thread 30.

The liquid propellant chamber 27 is closed at its downstream end by a rupturable annular diaphragm 35, encloses at its upstream end an annular floating piston 36, and has openings 38 registering with annular openings 37 in the inner casing 29 when the piston is in its illustrated position. Located adjacent these openings and between the plug 13 and the end cap member 11 is an explosive cartridge 39 which has a casing 39A. The means for firing this cartridge are illustrated as a firing pin 40 which is anchored to the member 11 by a shear pin 41 and actuated by a gas applied under pressure through an inlet port 42. Obviously the cartridge may be fired electrically, mechanically or in any other conventional manner.

Seal rings are provided at points where parts are moved with respect to one another. Thus the firing pin 40 has a seal ring 43, the piston 36 has seal rings 44 and 45, the piston 23 has a seal ring 46, and the member 19 has seal ring 47.

The gas generated by the firing of the cartridge 39 produces four effects after it ruptures the casing 39A. It passes through openings 37 and 38 causing the piston 36 to exert pressure on the liquid propellant whereby the diaphragm 35 is ruptured. It passes through slots 14 and openings 18 into recess 15 where it heats the flame holder 17. It passes through passageways 16 into the inner tube 12, driving the piston 23 toward the member 10 and unlocking the member 19 from the tube 12 which is fixed to the aircraft. It initiates the movement of the nozzle and liquid propellant chamber away from the aircraft.

This movement brings the member 19 into engagement with the shoulders or lands extending between the slots 14 in the detachable plug 13 so that the liquid propellant orifices 31 now open into the flame holder recess 15 where the highly heated platinum, or other material, ignites the liquid propellant. Further movement of the liquid chamber withdraws the plug 13 from the inner tube 12 which separates completely from the device. Under these conditions, the gas generated by the firing of the liquid propellant passes through the passageways 16 and around edge of the plug 13 and is discharged through the nozzle 32. Thereafter, the parts shown in FIG. 2 are separated from the inner tube and function as a liquid propellant rocket, its fuel being forced out of the chamber by the pressure of the trapped gas acting on the piston 36 and ignited by the flame holder 17. As explained in the aforesaid copending application, the nozzle 32 is so adjusted and directed as to provide the desired vertical and horizontal thrust.

We claim:
1. In a catapult having a first means for attaching it to a vehicle and a second means for attaching it to a mass to be moved from said vehicle, the combination of a tube closed at its downstream end by said first means and fixed thereto, an annular chamber fixed to said second means and encircling said tube, said annular chamber enclosing a liquid propellant and having a floating piston at its upstream end, a rupturable diaphragm adjacent the downstream end of said liquid propellant, a nozzle fixed to the downstream end of said annular chamber, an annular member fixed between said diaphragm and nozzle and having an interior shoulder perforated by passageways leading from said diaphragm through said shoulder, a plug detachably supported in the upstream end of said tube, means forming with the upper surface of said plug, said second means and said annular chamber a combustion chamber opening into said annular chamber on the upstream side of said floating piston, said plug having an exterior shoulder alined with the interior shoulder of said annular member and having an inner recess with a plurality of passageways leading from said combustion chamber through said recess out the downstream end of said plug, a flame holder in said recess, means locking the downstream end of said tube to said annular member, and means for generating in said combustion chamber a gas pressure whereby said diaphragm is ruptured, said locking means is actuated to release said annular member from said tube, said annular chamber is moved to bring said recess into alinement with the passageways of said annular member, and said interior and exterior shoulders are engaged to strip said plug from said tube.

2. In a catapult having a first means for attaching it to a vehicle and a second means for attaching it to a mass to be moved from said vehicle, the combination of a hollow member closed at its downstream end by said first means and fixed thereto, a container fixed to said second means and enclosing a liquid propellant, a floating piston at the upstream end of said propellant, a rupturable diaphragm at the downstream end of said propellant, a nozzle fixed to the downstream end of said container, a perforated member fixed between said diaphragm and nozzle and having an interior shoulder perforated by passageways leading from said diaphragm through said interior shoulder, a closure detachably supported in the upstream end of said hollow member the upper surface of which forms with said second means and said liquid propellant container a combustion chamber opening into said liquid propellant container on the upstream side of said floating piston, said closure having an exterior shoulder alined with said interior shoulder and having an inner recess with a plurality of passageways leading from said combustion chamber through said recess out the downstream side of said closure, a flame holder in said recess, means locking the downstream end of said hollow member to said perforated member, and means for generating in said combustion chamber a gas pressure whereby said diaphragm is ruptured, said locking means is actuated to release said perforated member from said hollow member, said liquid propellant container is moved to bring said recess into alinement with the passageways of said perforated member, and said exterior and interior shoulders are engaged to strip said closure from said hollow member.

3. In a catapult having a first means for attaching it to a vehicle and a second means for attaching it to a mass to be moved from said vehicle, the combination of a hollow member closed at its downstream end by said first means and fixed thereto, a liquid propellant container fixed to said second means, a floating piston in said container, a rupturable diaphragm at the downstream end of said container, a nozzle fixed to the downstream end of said container, a perforated member adjacent to said diaphragm and having perforations leading from said diaphragm to the interior of said perforated member, a closure detachably supported in the upstream end of said hollow member, said second means and said container forming with said closure a combustion chamber opening into said liquid propellant container on the upstream side of said floating piston, said closure having an inner recess with a passageway leading from said combustion chamber out of the downstream side of said closure, a flame holder in said recess, means interlocking said hollow member and said container, and means for generating in said combustion chamber a gas pressure whereby said diaphragm is ruptured, said interlocking means is actuated to release said container from said hollow member, and said container is moved to bring the passageways of said perforated member into alinement with said recess.

4. In a catapult having a first means for attaching it to a vehicle and a second means for attaching it to a mass to be moved from said vehicle, the combination of a hollow member closed at its downstream end by said first means and fixed thereto, a perforated closure detachably fixed to the upstream end of said hollow member and having a recess from which passageways extend through the upstream and downstream ends of said closure, a liquid propellant container fixed to said second means and forming with said second means and said perforated closure a combustion chamber located above said perforated closure and opening into the upstream end of said container, a pressure rupturable closure near the downstream end of said container, a nozzle fixed to the downstream end of said container, means forming an outlet from said rupturable closure, means locking said hollow member to said container, and means for generating in said combustion chamber a gas pressure whereby said locking means is actuated to release said container from said hollow member and said container is moved to aline said recess with said outlet from said rupturable closure.

References Cited in the file of this patent
UNITED STATES PATENTS

| 2,552,181 | Kleinhans | May 8, 1951 |
| 2,671,312 | Roy | Mar. 9, 1954 |
| 2,799,988 | Larrecq et al. | July 23, 1957 |
| 2,874,539 | Fox | Feb. 24, 1958 |
| 2,900,150 | Hirt et al. | Aug. 18, 1959 |

OTHER REFERENCES

Aviation Week (Human Factors), vol. 65, No. 20, Nov. 12, 1956, pp. 71, 72, 74 and 77.